(12) United States Patent
Oroskar et al.

(10) Patent No.: US 8,644,841 B1
(45) Date of Patent: Feb. 4, 2014

(54) DYNAMIC ADJUSTMENT OF HANDOFF BIAS BASED ON LOAD

(75) Inventors: Siddharth S. Oroskar, Overland Park, KS (US); Sachin R. Vargantwar, Overland Park, KS (US); Manoj Shetty, Overland Park, KS (US); Maulik Shah, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 402 days.

(21) Appl. No.: 13/039,725

(22) Filed: Mar. 3, 2011

(51) Int. Cl.
*H04W 72/00* (2009.01)
*H04B 7/00* (2006.01)

(52) U.S. Cl.
USPC ............ 455/453; 455/444; 455/442; 455/522

(58) Field of Classification Search
USPC ............... 455/444, 453, 442, 439, 522, 67.13
See application file for complete search history.

(56) References Cited

U.S. PATENT DOCUMENTS

| | | | | |
|---|---|---|---|---|
| 7,142,861 B2 * | 11/2006 | Murai | | 455/444 |
| 2008/0096576 A1 * | 4/2008 | Brueck et al. | | 455/453 |
| 2010/0246705 A1 * | 9/2010 | Shin et al. | | 375/267 |

* cited by examiner

*Primary Examiner* — Tilahun B Gesesse

(57) ABSTRACT

A method and system is disclosed for dynamically adjusting a signal-to-noise (SNR) bias based on relative load between a macro type base station and a micro type base station of a wireless communication system. The SNR bias corresponds to a threshold differential SNR between SNRs of the macro base station and of the micro base station, wherein the SNR bias is configured to be provided to an access terminal (or user equipment) to cause the access terminal (i) to be biased to seek service from the micro base station if the access terminal detects an SNR from the micro base station that is less than the threshold differential SNR below an SNR that the access terminal detects from the macro base station, and (ii) to be biased to seek service from the macro base station otherwise. Once the SNR bias is determined based on the relative load, it is communicated to one or more access terminals.

25 Claims, 7 Drawing Sheets

| Macro Base Station Loading (x percent) ⟵502 | Micro Base Station Loading (y percent) ⟵504 | Bias Threshold Difference SINR (dB) ⟵506 |
|---|---|---|
| x > 90 | y > 80 | 4 |
|  | 60 < y ≤ 80 | 5 |
|  | y ≤ 60 | 6 |
| 80 < x ≤ 90 | y > 80 | 3 |
|  | 60 < y ≤ 80 | 4 |
|  | y ≤ 60 | 5 |
| 60 < x ≤ 80 | y > 80 | 2 |
|  | 60 < y ≤ 80 | 3 |
|  | y ≤ 60 | 4 |
| 40 < x ≤ 60 | y > 80 | 1 |
|  | 60 < y ≤ 80 | 2 |
|  | y ≤ 60 | 3 |
| x ≤ 40 | y > 80 | 0 |
|  | 60 < y ≤ 80 | 1 |
|  | y ≤ 60 | 2 |

DYNAMIC ADJUSTMENT OF HANDOFF BIAS BASED ON LOAD

BACKGROUND

In a typical cellular radio communication system (wireless communication system), an area is divided geographically into a number of cell sites, each defined by a radio frequency (RF) radiation pattern from a respective antenna or antenna system. The antennas in the cells are in turn coupled to one or another form of controller, which is then coupled to a telecommunications switch or gateway, such as a mobile switching center (MSC) and/or a packet data serving node (PDSN) for instance. These (and possibly other) elements function collectively to form a Radio Access Network (RAN) of the wireless communication system. The switch or gateway may then be coupled with a transport network, such as the PSTN or a packet-switched network (e.g., the Internet).

Depending on the specific underlying technologies and architecture of a given wireless communication system, the RAN elements may take different forms. In a code division multiple access (CDMA) system configured to operate according IS-2000 and IS-856 standards, for example, the antenna system is referred to as a base transceiver system (BTS), and is usually under the control of a base station controller (BSC). In a universal mobile telecommunications system (UMTS) configured to operate according to ITU IMT-2000 standards, the antenna system is usually referred to as a NodeB, and is usually under the control of a radio network controller (RNC). Other architectures and operational configurations of a RAN are possible as well.

A subscriber (or user) in a service provider's wireless communication system accesses the system for communication services via a communication device, such as a cellular telephone, "smart" phone, pager, or appropriately equipped portable computer, for instance. In a CDMA system the communication device is referred to as an access terminal (also referred to herein by "AT"); in a UMTS system the communication device is referred to as user equipment (also referred to herein by "UE"). When an AT or UE is positioned in a cell, it communicates via an RF air interface with the BTS or NodeB antenna of the cell. Consequently, a communication path or "channel" is established between the AT or UE and the transport network, via the air interface, the BTS or NodeB, the BSC or RNC, and the switch or gateway.

As the demand for wireless communications has grown, the volume of call traffic in most cell sites has correspondingly increased. To help manage the call traffic, most cells in a wireless network are usually further divided geographically into a number of sectors, each defined respectively by radiation patterns from directional antenna components of the respective BTS or NodeB, or by respective antennas. These sectors can be referred to as "physical sectors," since they are physical areas of a cell site. Therefore, at any given instant, an AT or UE in a wireless network will typically be positioned in a given physical sector and will be able to communicate with the transport network via the BTS or NodeB serving that physical sector.

The functional combination of a BTS of a cell or sector with a BSC, or of a NodeB and an RNC, is commonly referred to as a "base station." The actual physical of a configuration of a base station can range from an integrated BTS-BSC or NodeB-RNC unit to a distributed deployment of multiple BTSs under a single BSC, or multiple NodeBs under a single RNC. Regardless of whether it is configured to support one cell, multiple cells, or multiple sectors, a base station is typically deployed to provide coverage over a geographical area on a scale of a few to several square miles and for tens to hundreds to several thousands (or more) of subscribers at any one time. On this scale, coverage is referred to as "macro-network coverage" and the base station is referred to as a "macro-type base station."

More recently, a type of base-station functional unit aimed at coverage over a much smaller physical area and at concurrent support of many fewer subscribers has been introduced. Referred to generically herein as a "micro-type base station," this device can be used to fill in local coverage gaps in macro-network coverage (e.g., in buildings), or to provide localize, small-area coverage where no macro-network coverage exists. When deployed as an integral component of a RAN, a micro-type base station is also referred to as a "picocell."

Service providers have also begun offering even smaller micro-type base stations as consumer devices, under the technical moniker of "femtocells." Comparable in size to desktop phone, femtocells can similarly fill in gaps in macro-network coverage (e.g., in buildings), while providing limited and exclusive coverage to individual subscribers within residential (or other small-scale) spaces. Instead of connecting as an integral component of the RAN to an MSC, PDSN, or other network switch, a femtocell communicates with the service provider's network via one or another form of broadband connection associated with or available to the consumer-owner (or renter) of the femtocell, for example from an internet service provider (ISP).

A subscriber may move between neighboring coverage areas of macro-type base stations and micro-type base stations, and even between neighboring coverage areas of different micro-type base stations, in the same way the subscriber moves between neighboring macro coverage areas. More specifically, as a subscriber at an AT or UE moves between wireless coverage areas of a wireless communication system, such as between cells, sectors, or micro coverage areas, or when network conditions change or for other reasons, the AT or UE may "hand off" from operating in one coverage area to operating in another coverage area. In a usual case, this handoff process is triggered by the AT or UE monitoring the signal strength of various nearby available coverage areas, and the BSC or RNC (or other controlling network entity) determining when one or more threshold criteria are met. For instance, an AT may continuously monitor signal strength from various available sectors and notify a BSC when a given sector has a signal strength that is sufficiently higher than the sector in which the AT is currently operating. The BSC may then direct the AT to hand off to that other sector. By convention, an AT or UE is said to handoff from a "source" cell or sector (or base station) to a "target" cell or sector (or base station).

OVERVIEW

A mix of macro-type base stations and micro-type base stations may be deployed within a RAN in what is sometimes termed a "heterogeneous" RAN, or just a heterogeneous access network. In a heterogeneous RAN, macro and micro coverage areas may augment each other in non-overlapping areas, may overlap with one another, or both. Because micro coverage areas are typically much smaller than macro coverage areas, overlapping coverage can include configurations in which a micro coverage area is entirely contained within a macro coverage area. The size of a coverage area (macro or micro) is typically measured in terms of the region within which the signal strength of the associated base station (macro-type or micro-type) is above some threshold level.

For any of these forms of heterogeneous RAN, and particularly for the instances in which micro coverage areas are contained within macro coverage areas, the signal strength of a micro-type base station may be greater than or at least comparable to that of a given nearby macro-type base station only very close to the micro-type base station, and possibly only within a region smaller than the associated micro coverage area (as measured by a signal strength threshold). Consequently, an AT or UE may tend to seek service from the given macro-type base station instead of the micro-type base station, except when located close enough to the micro-type base station to detect a sufficiently strong signal. Although superior signal strength of a first coverage area compared with a second is generally a criterion for selection of the first coverage area for service (e.g., via handoff procedures), there can be circumstances, particularly in a heterogeneous RAN, under which an AT or UE could or should prefer service from a micro-type base station rather than from a macro-type base station, even when the AT or UE detects a stronger signal from the macro-type base station. For example, the AT or UE may have better line-of-sight visibility to the micro-type base station. There could be other reasons as well.

In order to accommodate such circumstances, some wireless protocols implement a threshold differential signal strength that allows an AT or UE to seek (or maintain) service from a micro-type base station when the AT or UE nevertheless detects a stronger signal from a macro-type, as long as the detected signal from the micro-type base station is not more than the threshold differential signal strength below the detected signal from the macro-type base station. The threshold differential signal strength is sometimes referred as a signal strength bias, because an AT or UE can be biased to seek (or maintain) service from the micro-type base station under conditions that would otherwise favor selection of the macro-type base station. The bias can be considered as having the effect of enlarging the region around a micro-type base station within which ATs or UEs may seek, acquire, or maintain service from the micro-type base station in the presence of a more strongly detected signal from a macro-type base station.

Typically, signal strength is determined as one or another form of signal-to-noise ratio (SNR), and threshold differential signal strength can similarly be measured in terms of an SNR bias. The larger the bias, the greater the tendency for an AT or UE to favor service from a micro-type base station over a macro-type base station, and vice versa. Consequently, the SNR bias can also impact the distribution of load between macro-type and micro-type base stations. To the extent that an AT or UE seeks service from among two or more base stations (or sectors) through a handoff process, the SNR bias can also be considered operationally as a "handoff bias," since it can bias the selection of a target base station for a handoff.

In conventional operation, the SNR bias is a fixed parameter of a wireless communication system. As a consequence, the real-time load distribution of ATs and/or UEs among macro-type and micro-type base stations—which varies dynamically—cannot be accounted for in a parameter that itself can impact the load distribution. Accordingly, it would be desirable to be able to adjust the SNR bias based on the relative load among base stations in a heterogeneous access network.

Hence, in one respect, various embodiments of the present invention provide, in a device configured to communicate with a plurality of heterogeneous types of base stations of a wireless communication system, the plurality including at least a macro base station and a micro base station, a method comprising: at the device, determining a relative load of access terminals being served by the macro base station and by the micro base station; at the device, based on the determined relative load, adjusting a signal-to-noise ratio (SNR) bias corresponding to a threshold differential SNR between SNRs of the macro base station and of the micro base station, wherein the SNR bias is configured to be provided to an access terminal to cause the access terminal (i) to be biased to seek service from the micro base station if the access terminal detects an SNR from the micro base station that is less than the threshold differential SNR below an SNR that the access terminal detects from the macro base station, and (ii) to be biased to seek service from the macro base station otherwise; and at the device, communicating the adjusted SNR bias to one or more access terminals.

In another respect, various embodiments of the present invention provide, a device configured to communicate with a plurality of heterogeneous types of base stations of a wireless communication system, the plurality including at least a macro base station and a micro base station, the device comprising: means for determining a relative load of access terminals being served by the macro base station and by the micro base station; means for adjusting a signal-to-noise ratio (SNR) bias based on the determined relative load, wherein the SNR bias corresponds to a threshold differential SNR between SNRs of the macro base station and of the micro base station, and wherein the SNR bias is configured to be provided to an access terminal to cause the access terminal (i) to be biased to seek service from the micro base station if the access terminal detects an SNR from the micro base station that is less than the threshold differential SNR below an SNR that the access terminal detects from the macro base station, and (ii) to be biased to seek service from the macro base station otherwise; and means for communicating the adjusted SNR bias to one or more access terminals.

In still another respect, various embodiments of the present invention provide a nontransitory computer-readable medium having instructions stored thereon that, upon execution by a device configured to communicate with a macro base station and a micro base station of a wireless communication system, cause the device to carry out functions comprising: determining a relative load of access terminals being served by the macro base station and by the micro base station; based on the determined relative load, adjusting a signal-to-noise ratio (SNR) bias corresponding to a threshold differential SNR between SNRs of the macro base station and of the micro base station, wherein the SNR bias is configured to be provided to an access terminal to cause the access terminal (i) to be biased to seek service from the micro base station if the access terminal detects an SNR from the micro base station that is less than the threshold differential SNR below an SNR that the access terminal detects from the macro base station, and (ii) to be biased to seek service from the macro base station otherwise; and communicating the adjusted SNR bias to one or more access terminals.

These as well as other aspects, advantages, and alternatives will become apparent to those of ordinary skill in the art by reading the following detailed description, with reference where appropriate to the accompanying drawings. Further, it should be understood that this summary and other descriptions and figures provided herein are intended to illustrate the invention by way of example only and, as such, that numerous variations are possible. For instance, structural elements and process steps can be rearranged, combined, distributed, eliminated, or otherwise changed, while remaining within the scope of the invention as claimed.

BRIEF DESCRIPTION OF THE DRAWINGS

FIG. 5 is an example table of relative loading between a macro-type base station and a micro-type base station, which can be used in an example embodiment of a method of adjusting SNR bias based on load.

DETAILED DESCRIPTION

Example embodiments presented herein will be described by way of example with reference to wireless communication systems in general, and to third generation partnership project (3GPP) Long Term Evolution ("LTE") Advanced communication systems in particular. It will be appreciated that wireless communication systems employ a range of technologies designed to operate according to a number of related standards and protocols, including, without limitation, IS-2000, IS-856, IMT-2000, WiMax, and WiFi, among others, in order to deliver both circuit-cellular and wireless packet-data services. Underlying access technologies include CDMA, time division multiple access (TDMA), and orthogonal frequency division multiple access (OFDMA), among others.

Wireless communications systems are generally classified under the umbrella of one or another representative system architecture. One example is a "CDMA network," which, despite its label, can include both CDMA-based wireless access (e.g., as specified under IS-2000) and TDMA-based wireless access (e.g., as specified under IS-856), among other technologies. Other examples include "UMTS networks," which also can include CDMA-based wireless access (e.g., as specified under IMT-2000), and "LTE Advanced networks," which can include OFDMA-based wireless access, and are sometimes considered as next-generation variants of, and deployed within, UMTS networks. While the discussion herein focuses on embodiments in LTE Advanced networks, it should be understood that embodiments in other types wireless communication systems are possible, including, without limitation, CDMA networks and UMTS networks, and that the example of LTE Advanced should not be viewed as limiting.

Figure 1:
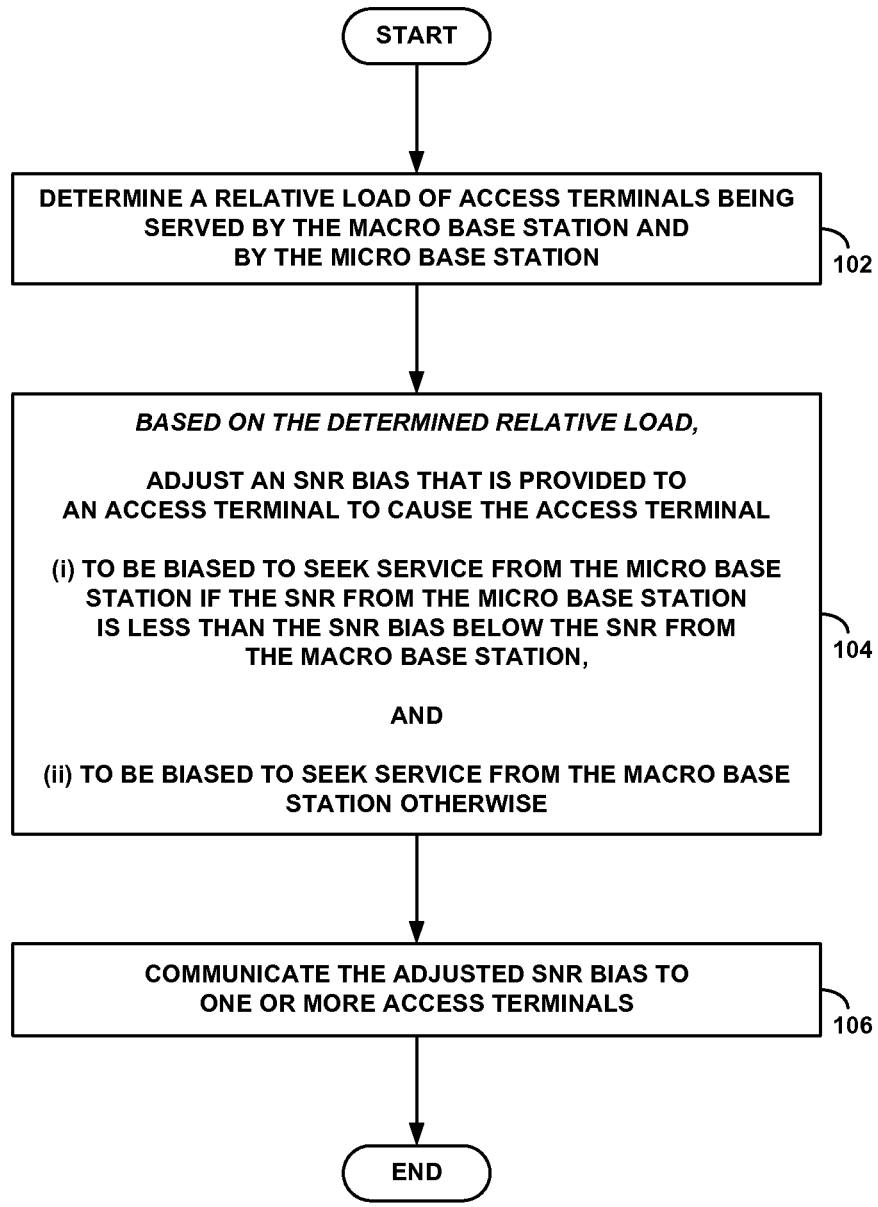
FIG. 1 is a flowchart depicting an example embodiment of a method of adjusting SNR bias based on load.

FIG. 1 is a flowchart depicting an example embodiment of a method of adjusting SNR bias based on load. By way of example, the steps of the flowchart could be implemented in a device, such as RAN element, configured to communicate with a plurality of heterogeneous types of base stations of a wireless communication system. In accordance with the example embodiment, the plurality of heterogeneous types of base stations could include at least one each of a macro-type base station (or just "macro base station)" and a micro-type base station (or just "micro base station"). The macro base station could be a cell or a sector, and the micro base station could be a microcell, picocell, or femtocell.

Also by way of example, the macro and micro base stations could further be macro and micro "evolved NodeB" (eNodeB) elements, each configured to operate under LTE Advanced, and the RAN device could be a Mobility Management Entity (MME), also configured to operate under LTE Advanced. Alternatively, the macro and micro base stations could further be macro and micro NodeB elements and the RAN device could be an RNC, all configured to operate under UMTS. As still a further alternative, the macro base station could comprise a BTS configured to operate under IS-2000 and/or IS-856, and the micro base station could comprise a picocell or femtocell similarly configured to operate under IS-2000 and/or IS-856. Additionally, the RAN device could be a BSC configured to operate under IS-2000 and/or IS-856.

At step 102, the device determines a relative load of access terminals being served by the macro base station and by the micro base station. The relative load could be determined in a number of ways. For example, it could be computed as a ratio of the number of ATs or UEs being served by the macro base station to the number of access terminals being served by the micro base station. Since the service capacity of a macro base station is typically much larger than that of a micro base station, a simple number ratio might need to be interpreted in view of the respective service capacities. In terms of delivering service to ATs or UEs, the service capacity of a base station relates generally to a level or amount of service the base station is capable of supporting. This could be measured in a variety of ways or take into account a number of factors, including number of concurrent voice calls or data sessions that can be supported, number of ATs or UEs with active connections to the base station (e.g., cell, sector, microcell, etc.) that can be supported, and volume or amount of data traffic that can be handled, among others.

The determination of relative load between the macro base station and the micro base station could alternatively directly take account of the respective service capacities. More specifically, the device could determine both a first fraction of the maximum service capacity of the macro base station being used by the macro base station to serve a first group of access terminals, and a second fraction of the maximum service capacity of the micro base station being used by the micro base station to serve a second group of access terminals. The relative load could then be determined by comparing the first and second fractions. Note that the fraction of service capacity being used at any time is sometimes referred to as utilization, and can also be expressed as a percentage of capacity.

The device could receive the requisite information to make the determination of relative load in a number of ways. For example, the macro base station and the micro base station could each report their respective number of ATs or UEs being served to the device via respective communication links to the device, and the device could then compute the simple ratio of the respective numbers. The device could also or instead compute respective loads as respective utilizations. Alternatively, the macro base station and micro base station could each report their respective utilization to the device, and the device could the compare the respective utilizations. The comparison could include computing a ratio of utilizations, consulting a look-up table or similar data structure to associated the respective utilizations with comparison outcome values or variables, or other forms of correlation.

At step 104, the device adjusts an SNR bias based on the determined relative load. In accordance with the example embodiment, the SNR bias corresponds to a threshold differential SNR between SNRs of the macro base station and of the micro base station. The SNR bias is provided an AT or UE so as to cause the AT or UE to: (i) be biased to seek service from the micro base station if the AT or UE detects an SNR from the micro base station that is less than the threshold differential SNR below an SNR that the access terminal detects from the macro base station; or (ii) be biased to seek service from the macro base station otherwise.

It may be seen that while the adjustment of the SNR bias is carried out by the device in response to the relative load determined at step 102, the purpose of the SNR bias is to induce particular behavior in an AT or UE that is provided with the SNR bias. Specifically, the SNR bias enables the AT or UE to seek service from a micro base station that is more weakly detected than a macro base station, provided the SNR detected from the micro base station is not more than the SNR bias below the SNR detected from the macro base station. When this condition is met, the AT or UE is thus biased to seek service from the micro base station. When this condition is not met—i.e., when the SNR detected from the micro base station is more than the SNR bias below the SNR detected from the macro base station—the AT or UE is instead biased to seek service from the macro base station.

Note that since the macro base station could be configured as a cell or possibly as multiple sectors, the SNR of the macro base station as detected by the AT or UE and applied as described in step 104 corresponds to the SNR of the cell or a sector. Similarly and the SNR of the micro base station as detected by the AT or UE and applied as described in step 104 corresponds the SNR of a microcell, picocell, or femtocell. More particularly, for an embodiment in a system configured to operate under LTE Advanced, the SNR or the macro and micro base stations could correspond to a signal plus noise and interference (SINR) detected from macro and micro eNodeB entities. In this case, the SNR bias would correspond to a SINR bias. Similarly, SNR could correspond to SINR, and the SNR bias could correspond to a SINR bias, in either or both of UMTS or IS-2000/IS-856 based wireless communication systems. As will be discussed below, SINR may be determined by an AT or UE through detection of a pilot signal from the base station (e.g., cell, sector, microcell, etc.).

In accordance with the example embodiment, causing the AT or UE to be biased to seek service from the micro base station corresponds to causing the access terminal to be biased to hand off to the micro base station. Similarly, causing the AT or UE to be biased to seek service from the macro base station corresponds to causing the access terminal to be biased to hand off to the macro base station. More specifically, relative signal strength among two or more base stations as detected by an AT or UE is typically a criterion for selecting which of the base stations to hand off to. In the absence of the SNR bias, for instance, an AT or UE will preferentially hand off to the base station (or sector, for example) with the strongest signal (SNR) when more than one base station and corresponding signal is available (and detectable). The SNR bias enables the AT or UE to hand off to a base station with a more weakly detected signal.

In further accordance with the example embodiment, the device will adjust the SNR bias in such a manner that the biasing effect advantageously balances (i) the degree to which an AT or UE favors the micro base station over the macro base station against (ii) the relative load of the micro base station and the macro base station. In particular, the SNR bias will be adjusted to more strongly favor the micro base station when the macro base station is more heavily loaded relative to the micro base station. Conversely, the SNR bias will be adjusted to more strongly favor the macro base station (or to less strongly favor the micro base station) when the macro base station is less heavily loaded relative to the micro base station.

More specifically, the device will increase the SNR bias if the determined relative load corresponds to a load on the macro base station being greater than a threshold differential load above a load on the micro base station. Conversely, the device will decrease the SNR bias if the determined relative load corresponds to the load on the macro base station being less than the threshold differential load above the load on the micro base station. Since the SNR bias governs how far the detected SNR of the micro base station may be below the detected SNR of the macro base station before the AT or UE hands off from the micro base station to the macro base station, increasing the SNR bias increases the tendency of the AT or UT to favor service from the micro base station, whereas decreasing the SNR bias decreases the tendency of the AT or UT to favor service from the micro base station. Thus, increasing the SNR bias in response to high relative loading of the macro base station (compared with the micro base station) advantageously helps ease the loading (or at least helps avoid compounding the loading) on the macro base station. Similarly, decreasing the SNR bias in response to low relative loading of the macro base station (compared with the micro base station) advantageously lowers a barrier to increased loading on the macro base station for circumstances in which the increased loading is not (or at least less likely to be) a problem.

It will be appreciated that the above discussion can be cast in terms of the effect of loading on the micro base station, whereby the device will decrease the SNR bias if the determined relative load corresponds to a load on the micro base station being greater than a threshold differential load above a load on the macro base station; and the device will increase the SNR bias if the determined relative load corresponds to the load on the micro base station being less than the threshold differential load above the load on the macro base station. Similarly, handoff direction can be cast in terms the effect of the SNR bias on handing off from the macro base station to the micro base station. Thus, the SNR bias can be considered as governing how high the detected SNR of the micro base station needs to be relative a more strongly detected SNR of the macro base station before the AT or UE hands off from the macro base station to the micro base station. In this sense, decreasing the SNR bias in response to high relative loading of the micro base station (compared with the macro base station) advantageously helps ease the loading (or at least helps avoid compounding the loading) on the micro base station. And, increasing the SNR bias in response to low relative loading of the micro base station (compared with the macro base station) advantageously lowers a barrier to increased loading on the micro base station for circumstances in which the increased loading is not (or at least less likely to be) a problem.

Finally, at step 106, the device communicates the adjusted SNR bias to one or more ATs or UEs. In accordance with the example embodiment, the adjusted SNR bias (e.g. an adjusted SINR bias) will be communicated to each of the macro base station and the micro base station. Each will then transmit the adjusted SNR bias to ATs or UEs being served. Thus, the macro base station will transmit the adjusted SINR bias to ATs or UEs that it is serving, and likewise for the micro base station. Note that some ATs or UEs may be being concurrently served by both the macro base station and the micro base station. In any case, upon receiving the adjusted SNR bias, the ATs or UEs will operate in the advantageous manner described above with respect to seeking or maintaining service from the macro or micro base station.

It will be appreciated that the example embodiment could include alternate and/or additional steps. Moreover, the RAN device is not limited to an RNC, MME or BSC. For example the device could be the macro base station or the micro base station. In this case, the macro and micro base stations could exchange messages containing information that allows one or the other to act as the device described above. This configuration would allow any pair of macro and micro base stations to carry out the example method without necessarily involving a controlling entity, such as an RNC, MME, or BSC.

Figure 2B:
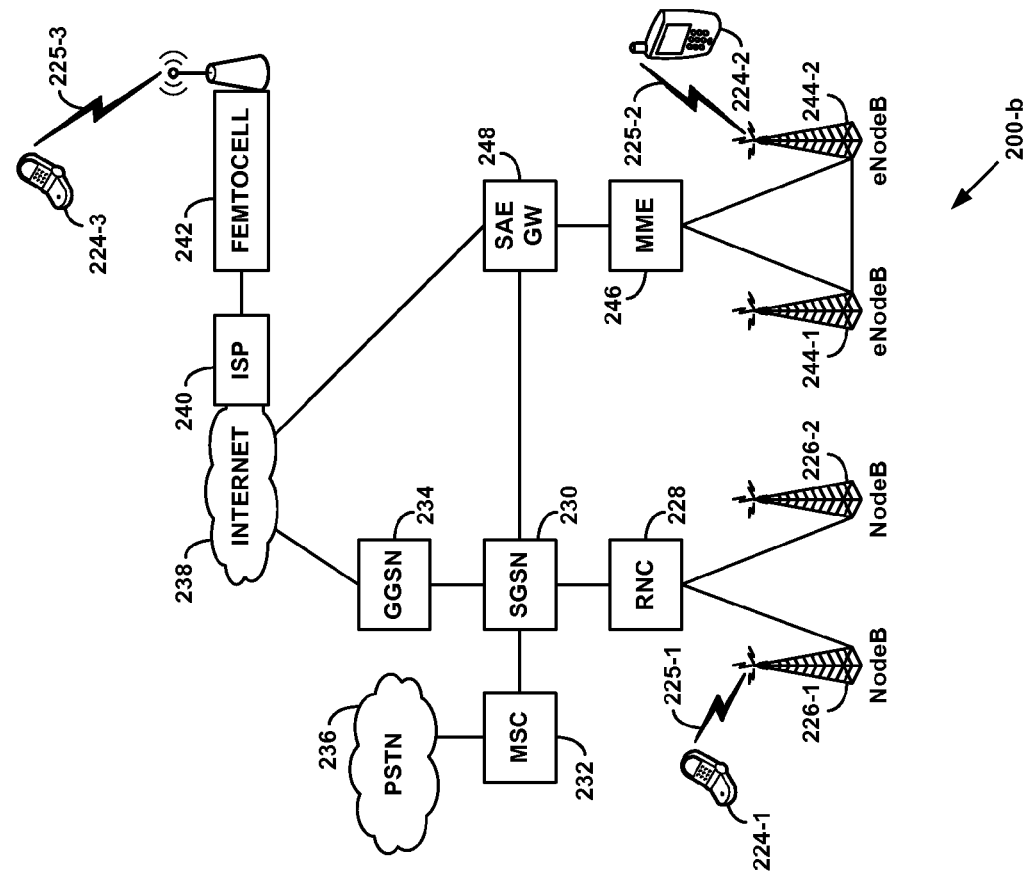
FIG. 2*b* is a simplified block diagram of a second type of example wireless communication system in which an example embodiment of a method of adjusting SNR bias based on load could be carried out.
Figure 2A:
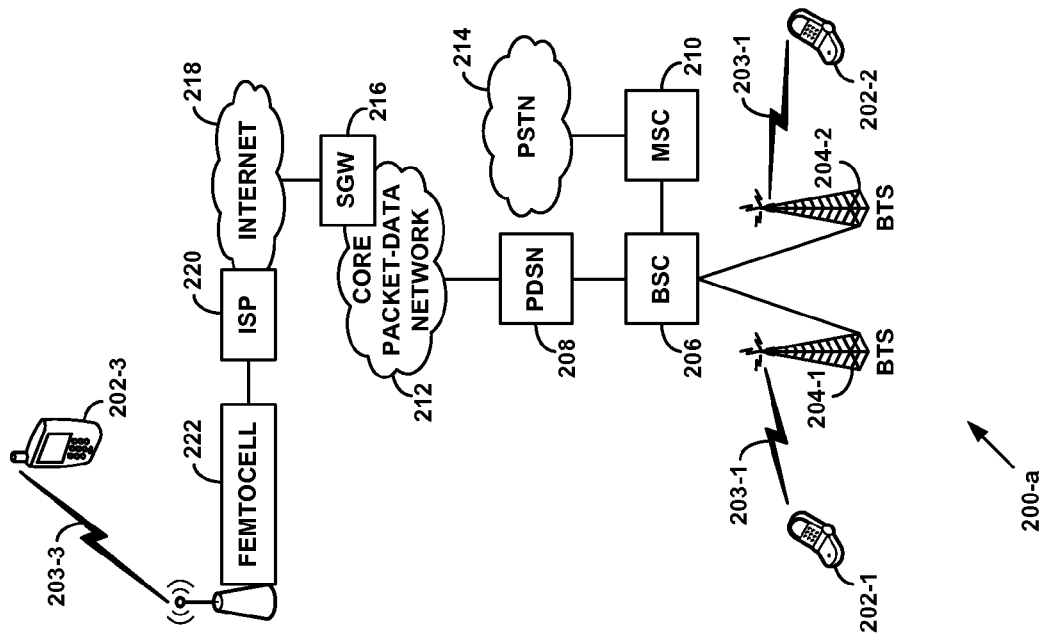
FIG. 2*a* is a simplified block diagram of a first type of example wireless communication system in which an example embodiment of a method of adjusting SNR bias based on load could be carried out.

FIG. 2a shows a simplified block diagram of an example CDMA network 200-a that can be operated by a wireless service provider, and in which an example method of adjusting SNR bias based on load can be employed. FIG. 2b similarly shows a simplified block diagram of an example combined UMTS/LTE Advanced network 200-b that can be operated by a wireless service provider, and also in which an example method of adjusting SNR bias based on load can be employed. It will be appreciated that the depiction of just these two types of example networks is presented herein for illustrative purposes, and is not intended to be limiting with respect to embodiments of adjusting SNR bias based on load, or to the types of networks in which such embodiments may be devised or deployed.

In the CDMA network 200-a, subscribers engage in communications in the wireless communication system via access terminals exemplified by ATs 202-1, 202-2 and 202-3. Accordingly, ATs 202-1, 202-2 and 202-3 may also be taken as representing subscribers in network 200-a. Similarly, in the UMTS/LTE Advanced network 200-b, subscribers engage in communications in the wireless communication system via user equipment entities exemplified by UEs 224-1, 224-2, and 224-3. Accordingly, UEs 224-1, 224-2, and 224-3 may similarly be taken as representing subscribers in network 200-b.

As shown in FIG. 2a, AT 202-1 communicates over an air interface 203-1 with a BTS 204-1, which is then coupled with a BSC 206. Similarly, AT 202-2 communicates over an air interface 203-2 with a BTS 204-2, which is then also coupled with a BSC 206; and AT 202-3 communicates over an air interface 203-3 with a femtocell 222, which is then coupled with the network 200a by way of a public internet 218 via a broadband connection between the femtocell and an internet service provider (ISP) 220. The air interfaces 203-1, 203-2, and 203-3 could support either or both of IS-2000 and IS-856 communications. Transmissions over the air interface 203-1 from the BTS 204-1 to the AT 202-1 represent a "forward link" from the BTS to the access terminal, while transmissions over interface 203-1 from the AT 202-1 to the BTS 204-1 represent a "reverse link" from the AT. The same definition of forward and reverse link applies for transmissions between the BTS 204-1 and the AT 202-2 over the air interface 203-1, and similarly for transmissions between the femtocell 222 and the AT 202-3 over the air interface 203-3.

BSC 206 is connected to MSC 210, which acts to control assignment of air traffic channels (e.g., over air interface 203-1, 2, 3), and provides access to wireless circuit-switched services such as circuit-voice and circuit-data (e.g., modem-based packet data) service. As represented by its connection to PSTN 214, MSC 210 is also coupled with one or more other MSCs, other telephony circuit switches in the operator's (or in a different operator's) network, or other wireless communication systems, thereby supporting user mobility across MSC regions, roaming between systems, and local and long-distance landline telephone services.

BSC 206 is also connected to a PDSN 208, which in turn provides connectivity with the service provider's core packet-data network 212. Communications between the core network 212 and a public Internet 218 or the like are facilitated by a security gateway (SGW) 218, which may provide protective/defensive communication functionalities (e.g. firewalls or the like), as well as support secure communication channels between endpoints in the core network 212 and trusted, external devices such as the femtocell 222. By way of example, a secure communication channel could be an encrypted virtual private network (VPN) "tunnel" between the femtocell 222 and the SGW 216 or other VPN termination point in the core network 212.

Additional inter-network security gateways or border routers may support interconnections with other external packet networks. Although not shown in the figure, the core network 212 may also host servers and routers for supporting various operations, functions, and services, such as service management and user mobility. Examples of such network components include, without limitation, one or more authentication, authorization, and accounting (AAA) servers, and one or more mobile-IP home agents (HAs). The core network 212 could include additional switches, routers, and gateways that collectively provide transport and interconnection among the various entities and networks of network 200-a. In this context, for instance, core network 212 could be an overlay on or a sub-network of one or more additional networks.

Communications in the UMTS/LTE Advanced network 200-b are illustrated in FIG. 2b. Within the UMTS RAN, shown on the bottom left side of the figure, UE 224-1 communicates with NodeB 226-1 over air interface 225-1, which could support IMT-2000 communications, for example. Transmissions over the air interface 225-1 from the NodeB 226-1 to the UE 224-1 represent a "downlink" from the NodeB to the UE, while transmissions over interface 225-1 from the UE 224-1 to the NodeB 226-1 represent an "uplink" from the UE. The NodeB 226-1 is coupled with the RNC 228, which, by way of example, is also depicted as controlling a NodeB 226-2.

In addition to control of the NodeB elements, the RNC 228 also connects the access network with a core network, which in a UMTS system is typically configured according an architecture referred to as General Packet Radio Service (GPRS), as is known. More specifically, the RNC 228 is coupled with a Serving GPRS Support Node (SGSN) 230, which is coupled with MSC 232 and PSTN 236 for cellular communications services. The SGSN 230 is also coupled with a Gateway GPRS Support Note (GGSN) 234, which in turn provides secure connectivity with the public internet 238.

Within the LTE Advanced RAN, shown on the bottom right side of FIG. 2b, UE 224-2 communicates with eNodeB 244-1 over air interface 225-2. As in the UMTS RAN, transmissions over the air interface 225-2 from the eNodeb 244-1 to the UE 224-2 represent a downlink from the eNodeB to the UE, while transmissions over interface 225-2 from the UE 224-2 to the eNodeB 244-1 represent an uplink from the UE. Under LTE Advanced, the downlink operates according to OFDMA, while the uplink operates according to Single Carrier Frequency Division Multiple Access (SC-FDMA), as is known.

As shown, the eNodeB 244-1 is coupled with the MME 224, which, by way of example, is also depicted as controlling an eNodeB 244-2. The two eNodeBs 244-2 and 244-2 also have a direct communication link between them for support of LTE Advanced protocols. The MME 224 is coupled with a System Architecture Evolution Gateway (SAE GW) 230, which in turn provides secure connectivity to the Internet 238, as well as the core GPRS network via a communicative coupling with the SSGN 230.

Access to the UMTS/LTE Advanced network via a femtocell 242 is shown at the top of FIG. 2b, where UE 224-3 is shown to have a downlink from and an uplink to the femtocell 242 over the air interface 225-3. The air interface could support either or both of IMT-2000 or OFDMA/SC-FDMA as defined for LTE Advanced. As illustrated, the femtocell 242 is connected to the core GPRS network by way of the Internet 238, via a broadband connection between the femtocell and the ISP 240. As in the network 200-a in FIG. 2a, the connection with the GPRS network can be based on a secure VPN or the like.

Although not shown in FIG. 2b, the GPRS core network may also host servers and routers for supporting various operations, functions, and services, such as service management and user mobility. Examples of such network components include, without limitation, one or more authentication, authorization, and accounting (AAA) servers, and one or more mobile-IP home agents (HAs). The GPRS core network could also include additional switches, routers, and gateways that collectively provide transport and interconnection among the various entities and networks of network 200-b.

It should be understood that the depiction of just one or two of each network element in both FIG. 2a and FIG. 2b is illustrative, and there could be more of any of them, as well as other types of elements not shown. The particular arrangements shown in FIG. 2a and FIG. 2b should not be viewed as limiting with respect to the example embodiments presented herein. Further, the network components that make up a wireless communication system such as network 200-a or network 200-b are typically implemented as a combination of one or more integrated and/or distributed platforms, each comprising one or more computer processors, one or more forms of computer-readable storage (e.g., disks drives, random access memory, etc.), one or more communication interfaces for interconnection between elements and the network and operable to transmit and receive the communications and messages described herein, and one or more computer software programs (or other forms of computer logic instructions) and related data (e.g., machine-language instructions and program and user data) stored in the one or more forms of computer-readable storage and executable by the one or more computer processors to carry out the functions, steps, and procedures of the various example embodiments described herein. Similarly, a communication device such as example ATs 202-1, 202-2, and 202-3 or example UEs 224-2, 224-2, and 224-3, typically comprises a user-interface, I/O components, a communication interface, a tone detector, a processing unit, and data storage, all of which may be coupled together by a system bus or other mechanism. As such, networks 200-a and 200-b, ATs 202-1, 202-2, and 202-3, and UEs 224-2, 224-2, and 224-3, and air interfaces 203-1, 203-2, and 203-3, and 225-2, 225-2, and 225-3 collectively are representative of example means of implementing and carrying out the various functions, steps, and procedures described herein.

1. Example Access Technologies a. Conventional CDMA Communications

In a conventional CDMA wireless network compliant with the well known IS-2000 standard, each cell employs one or more carrier frequencies, typically 1.25 MHz in bandwidth each, and each sector is distinguished from adjacent sectors by a pseudo-random number offset ("PN offset"). Further, each sector can concurrently communicate on multiple different channels, distinguished by "Walsh codes." In doing so, each channel is allocated a fraction of the total power available in the sector. When an access terminal operates in a given sector, communications between the access terminal and the BTS of the sector are carried on a given frequency and are encoded by the sector's PN offset and a given Walsh code. The power allocated to each channel is determined so as to optimize the signal to noise characteristics of all the channels, and may vary with time according to the number of access terminals being serviced, and their relative positions with respect to the BTS, among other factors.

Air interface communications are divided into forward link communications, which are those passing from the base station to the access terminal, and reverse link communications, which are those passing from the access terminal to the base station. In an IS-2000 system, both the forward link and reverse link communications in a given sector are encoded by the sector's PN offset and a given Walsh code. On the forward link, certain Walsh codes are reserved for use to define control channels, including a pilot channel, a sync channel, and one or more paging channels (depending on service demand, for example), and the remainder can be assigned dynamically for use as traffic channels, i.e., to carry user communications. Similarly, on the reverse link, one or more Walsh codes may be reserved for use to define access channels, and the remainder can be assigned dynamically for use as traffic channels.

In order to facilitate efficient and reliable handoff of access terminals between sectors, under IS-2000 an AT can communicate on a given carrier frequency with a number of "active" sectors concurrently, which collectively make up the AT's "active set." Depending on the system, the number of active sectors can be up to six (currently). The access terminal receives largely the same signal from each of its active sectors and, on a frame-by-frame basis, selects the best signal to use. An AT's active set is maintained in the access terminal's memory, each active sector being identified according to its PN offset. The AT continually monitors a pilot signal from each of its active sectors as well as from other sectors, which may vary as the AT moves about within the wireless communication system, or as other factors cause the AT's RF conditions to change. More particularly, the AT monitors a signal-to-noise metric referred to as "signal to interference plus noise ratio" ("SINR"), which includes the degrading effects of interference as well as noise on RF conditions. The AT reports the received signal strengths to the serving base station, which then directs the AT to update its active set in accordance with the reported strengths and one or more threshold conditions. Note that an AT's active set can include a femtocell.

Typically, the power level of the pilot detected by an AT is specified as a gain level, x, according to the relation x dBm=10 $\log_{10}$(P/1 mW), where P is the power in mW (milliwatts). However, other power units could be specified. Measured in dBm, gain expresses a logarithmic ratio of power P to a fixed power level of 1 mW. More generally, the relative gain, y, of one power level $P_1$ to another $P_2$ is expressed as dB, and corresponds to a logarithmic ratio of $P_1$ to $P_2$ given by y dB=10 $\log_{10}(P_1/P_2)$. For instance, if y=3, then $P_1 \approx 2 \times P_2$; if y=−3, then $P_1 \approx 0.5 \times P_2$. In practice, SINR is measured in dB, where $P_1$ corresponds to the received power of the pilot and $P_2$ corresponds to the received noise plus interference power.

b. High Rate Packet-Data TDM Communications

Under IS-2000, the highest rate of packet-data communications theoretically available on a fundamental traffic channel of the forward link is 9.6 kbps, dependent in part on the power allocated to the forward-link traffic channel and the resultant signal to noise characteristics. In order to provide higher rate packet-data service to support higher bandwidth applications, the industry introduced a new "high rate packet data (HRPD) system," which is defined by industry standard IS-856.

IS-856 leverages the asymmetric characteristics of most IP traffic, in which the forward link typically carries a higher load than the reverse link. Under IS-856, each access terminal maintains and manages an active set as described above, but receives forward-link transmission from only one active sector at a time. In turn, each sector transmits to all its active ATs on a common forward link using time division multiplexing (TDM), in order to transmit to only one access terminal at a time, but at the full power of the sector. As a result of the full-power allocation by the sector, an access terminal operating under IS-856 can, in theory, receive packet-data at a rate of at least 38.4 kbps and up to 2.4 Mbps. The reverse link under IS-856 retains largely the traditional IS-2000 code division multiplexing (CDM) format, albeit with the addition of a "data rate control" (DRC) channel used by the AT to indicate the supportable data rate and best serving sector for the forward link. More specifically, the DRC channel is a sub-channel of a reverse-link Medium Access Control (MAC) channel.

TDM access on the IS-856 forward link is achieved by dividing the forward link in the time domain into time slots of length 2048 chips each. At a chip rate of 1.228 Mega-chips per second, each slot has a duration of 1.67 milliseconds (ms). Each time slot is further divided into two 1024-chip half-slots, each half-slot arranged to carry a 96-chip pilot "burst" (pilot channel) at its center and a forward-link MAC channel in two 64-chip segments, one on each side of the pilot burst. The remaining 1600 chips of each time slot (800 per half-slot) are allocated for a forward traffic channel or a forward control channel, so that any given time slot will carry either traffic-channel data (if any exists) or control-channel data. As in IS-2000, each sector in IS-856 is defined by a PN offset, and the pilot channel carries an indication of the sector's PN offset. Again, a sector could correspond to a femtocell.

c. LTE Advanced Communications

Under LTE Advanced, the downlink comprises multiple frequency carrier bands arranged to cover a total bandwidth of up to 20 MHz (currently) in frequency space. Each frequency carrier band is divided into 12 orthogonal subcarrier frequencies, each 15 kHz in width, for a total of 180 kHz per frequency carrier band. The number of frequency carrier bands corresponds to the integer division of the total bandwidth by 180 kHz. For example, a total bandwidth of 1.25 MHz supports six frequency carrier bands; a total bandwidth of 20 MHz supports 100 frequency carrier bands. The orthogonality of the subcarrier frequencies follows from each being an integer multiple of the same minimum frequency; e.g., 15 kHz. It will be appreciated that a different minimum frequency could be used, as long as the orthogonality condition is met. Similarly, a different number of subcarrier frequencies per frequency carrier band could be used, which could then lead to a different number frequency carrier bands for a given total bandwidth.

In the time domain, the downlink comprises time slots, each typically of 0.5 msec duration. Every two time slots makes up one "sub-frame" of 1.0 msec duration, and every 10 sub-frames makes up a 10 msec frame. Each time slot is subdivided into an integer number of symbol durations, such that the integer number multiplied by the symbol duration equals 0.5 msec. According to current standards, the integer number is either 6 or 7; the value used depends on operating conditions, among other possible factors. For the purposes of the present discussion the integer number of symbol durations per time slot will be taken to be 7, with the understanding that other values could be used.

Transmissions on the downlink are scheduled in time-frequency units referred to as "resource blocks" or RBs. Each RB is made up of 7 contiguous symbol durations (i.e., one time slot) and 12 subcarrier frequencies of a given frequency carrier band. Thus, an RB can be viewed a grid of 7 symbol durations by 12 subcarrier frequencies. Each element of the grid is referred to as "resource element," and each resource element carries one OFDM symbol. Each OFDM symbol of a resource element is a time domain symbol generated from Fourier superposition frequency domain symbols.

A single RB is the smallest unit of allocation made for a given UE for downlink transmissions. Allocations are typically made by an eNodeB serving the UE, and more than one RB can be allocated for the UE. Multiple RB allocations for a given UE can be made across multiple frequency carrier bands, across multiple time slots, or both, depending on factors including the amount of data to be transmitted to the UE, the type of data (e.g., best-effort, real-time, etc.), and downlink resources needed for other UEs.

In addition to carrying OFDM symbols specific to a given UE, particular resource elements of a given RB are allocated as "reference signals," and may be used to carry pilot signals from the eNodeB. Upon detection of a pilot signal in one or more resource elements of an RB, a UE may determine SINR of the eNodeB (or more generally, the LTE Advanced base station) that made the RB-based transmission. The UE may then use the SINR (or other SNR measure) of different eNodeBs that it detects to determine if and when to hand off from one to another, for example.

2. Adjustment of SNR Bias Based on Load a. Operating Principles

In an LTE Advanced RAN, eNodeB base stations, such as eNodeB 244-1 and 244-2 exemplified in FIG. 2b, can be deployed in a heterogeneous access network. As described above, a heterogeneous RAN is one that includes both macro base stations and micro base stations. In such deployments, one or more macro base stations (macro eNodeBs) generally provide large-area coverage, measured in miles or tens of miles, for example. One or more micro base stations (micro NodeBs) of a heterogeneous RAN typically provide small-area coverage, such as within a building or a portion of a building where macro coverage is weak or blocked. Micro base stations may also be used as the primary form of coverage in local regions beyond the reach of macro coverage.

Macro coverage and micro coverage of a heterogeneous RAN can overlap. For instance, a macro eNodeB might provide wide-area coverage in a metropolitan area that includes numerous buildings (e.g., skyscrapers in a city). In the same RAN, several micro eNodeBs might be deployed within some or all of the buildings. In such configuration, the micro coverage areas of the eNodeBs might be contained entirely within the macro coverage area of the macro eNodeB.

Figure 3:
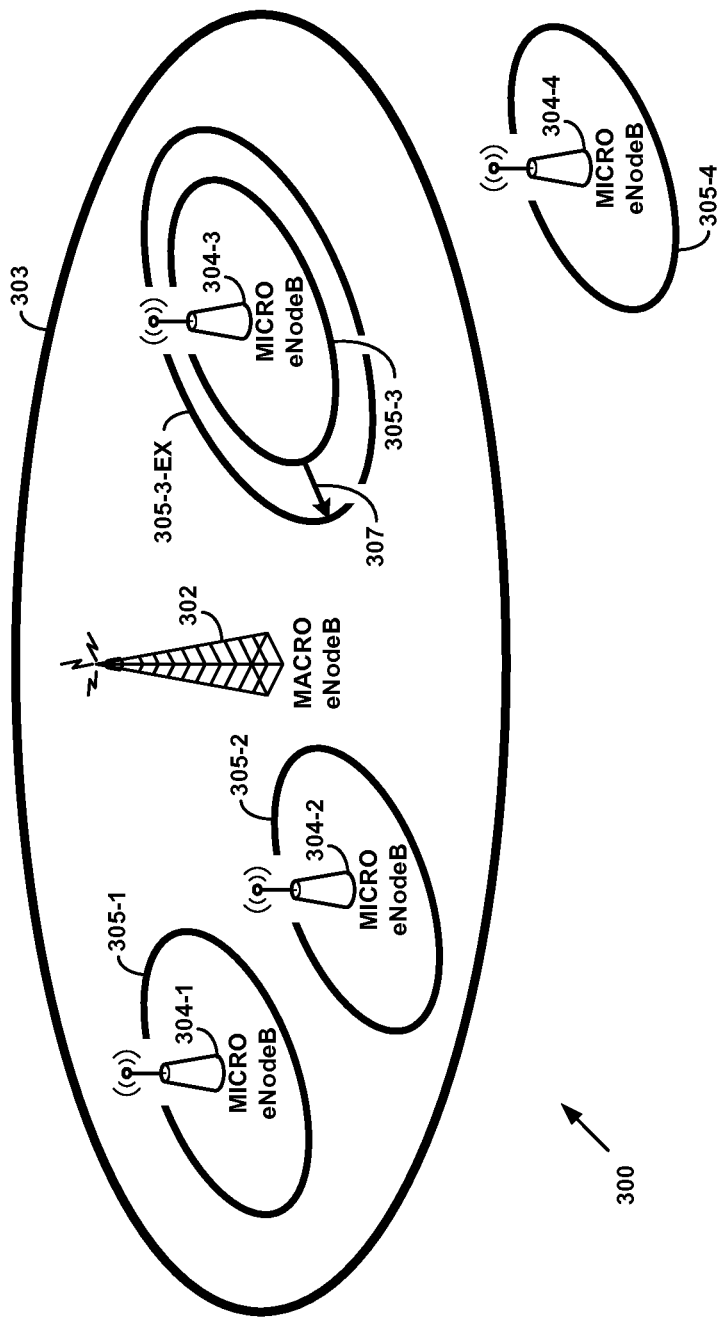
FIG. 3 illustrates an example of a heterogeneous access network, including a macro-type base stations and a plurality of micro-type base stations, in which an example embodiment of a method of adjusting SNR bias based on load could be carried out.

FIG. 3 illustrates a heterogeneous RAN 300 that includes one macro eNodeB 302 that provides a macro coverage area 303, and four micro eNodeBs 304-1, 304-2, 304-3, and 304-4. In view of the example LTE Advanced RAN illustrated in FIG. 2b, all of the eNodeBs might be configured under a single common MME, such as MME 246 in FIG. 2b. In the example illustrated in FIG. 3, the eNodeB 304-1 provides a micro coverage area 305-1 that is completely contained within the macro coverage area 303. Similarly, the micro coverage area 305-2 of the eNodeB 304-2 and the micro coverage area 305-3 of the eNodeB 304-3 are both also completely contained within the macro coverage area 303. By way of example, the micro coverage area 305-4 of the eNodeB 304-4 is located outside of the macro coverage area 303.

The size of a coverage area is usually measured in terms of the size of a region around the eNodeB within which the detected downlink signal is above a threshold level. For instance, a coverage area could correspond to a circle of radius R centered on the eNodeB, such that a UE positioned within the circle would detect SINR above a threshold SINR value. It will be appreciated that a coverage area may not necessarily be circular, and is represented as such herein for convenience of the present discussion.

Because the relative signal strengths (e.g., SINRs) of two or more eNodeBs is generally a criterion for a UE to handoff between the eNodeBs, and because the signal strength of a macro eNodeB is typically much stronger than that of a micro eNodeB, the threshold signal level at radius R of a given micro eNodeB may be below that of a nearby macro eNodeB. This may be particularly the case for a micro coverage area that is completely contained within a macro coverage area (e.g., micro coverage areas 305-1, 305-2, and 305-3 in FIG. 3). In this configuration, the UE may detect a stronger signal (SINR) from the micro eNodeB than from the macro eNodeB only when the UE is positioned closer to the micro eNodeB than radius R of the micro coverage area. Consequently, the UE may hand off to, or maintain service from, the micro eNodeB only within a region that is smaller than the actual micro coverage area of the eNodeB.

In view of the disparity between the signal strengths of macro and micro eNodeBs (and more generally, macro and micro base stations), it is sometimes convenient to alternately define a micro coverage area that is part of a heterogeneous RAN as the region within which the SINR of the micro eNodeB is at least as high as SINR of the macro eNodeB of the RAN. Taking this alternate definition, the boundaries of the micro coverage areas 305-1, 305-2, and 305-3 correspond to the loci of points at which SINR of the respective eNodeBs (304-1, 304-2, and 304-3) equals the SINR of the macro eNodeB 302. Although represented as circular in FIG. 3, it will again be appreciated that these micro coverage areas will not necessarily be circular in practice.

There may be circumstances in which it is advantageous or preferred for a given UE to seek or maintain service from a particular micro eNodeB rather than from a nearby macro eNodeB, even when the detected SINR of the micro eNodeB is below that of the macro eNodeB. For example, the UE might have a better line-of-sight view of the micro eNodeB, and a correspondingly better uplink. There could be other reasons to favor service from the more weakly-detected micro eNodeB as well. Under LTE Advanced, a UE can do this—i.e., favor service from a more weakly detected micro eNodeB—by applying a SINR bias to its comparison of SINR detected from a macro eNode and a micro eNodeB.

More particularly, when a UE operating in a heterogeneous RAN detects a SINR from a micro eNodeB that is below the SINR of a macro eNodeB in the RAN, the UE can hand off to, or maintain service from, the micro eNodeB, provided the detected SINR of the micro eNodeB is not more than the SINR bias below the detected SINR of the micro eNodeB. The effect of the SINR bias is to enlarge the size of the micro coverage area, and is referred to as "range expansion" or "range extension" in LTE Advanced.

Range expansion is illustrated conceptually in FIG. 3 for the micro eNodeB 304-3. For purposes of the present discussion, the alternate definition of a micro coverage area will be taken, whereby the boundary of the micro coverage area 305-3 corresponds to a locus of points for which SINR of the micro eNodeB 304-3 equals SINR of the macro eNodeB 302. Through range expansion, the radius of the micro coverage area 305-3 is increased by a range extension 307, resulting in an expanded micro coverage area 305-3-EX. While not necessarily evident from the form of the depiction in the figure, the range extension 307 can be achieved operationally by introducing a SINR bias into the comparison of SINR of the micro eNodeB 304-3 with SINR of the macro eNodeB 302.

As an example, if the SINR bias is taken to be 2 dB, then a UE could detect SINR from the micro eNodeB 304-3 as being up to 2 dB below SINR from the macro eNodeB 302, and nevertheless hand off to, or maintain service from, the micro eNodeB 304-3. In this case, the boundary of the expanded micro coverage area 305-3-EX corresponds to a locus of points for which SINR of the micro eNodeB 304-3 is 2 dB below the SINR of the macro eNodeB 302. It should be evident that a larger SINR bias will result in larger expanded micro coverage area, and vice versa. Again note that neither of micro coverage area 305-3 or 305-3-EX will necessarily be circular in practice, and are represented as such in FIG. 3 by way of example.

The SINR bias can not only the effect the range extension of a given micro coverage area, but can also impact the load distribution of UEs between the given micro coverage area and the macro coverage area of the heterogeneous RAN. This may occur, for example, because the increased size of the micro coverage area can allow a given UE to seek or retain service from the micro eNodeB when it might otherwise seek or retain service from the macro eNodeB. In addition, the extended range might also result in an increase the number of UEs that find themselves located within the boundary of the extended micro coverage area. Thus, range extension will generally tend to shift some portion of the load from the macro eNodeB to the micro eNodeB. The larger the SINR bias, the larger the tendency of this shift, and vice versa. Taking the converse view, suppression (or at least a decreased degree) of range extension will generally tend to reverse-shift some portion of the load from the micro eNodeB to the macro eNodeB. The smaller the SINR bias, the larger the tendency of this reverse-shift, and vice versa.

In conventional LTE Advanced operation, the SINR bias is a fixed or static parameter of a wireless communication system. Consequently, the relative loading of the macro eNodeB and the micro eNodeB of a heterogeneous RAN, which is a dynamic property of the RAN, is not accounted for in determining the size of the SINR bias. Yet the size of the SINR bias impacts the relative loading. Accordingly, it is advantageous to dynamically adjust the SINR bias based on the relative loading between a macro eNodeB and a micro eNodeB.

More particularly, the SINR bias applied for a given macro eNodeB and micro eNodeB of a heterogeneous RAN will be adjusted to a larger value for a higher relative loading on the macro eNodeB, and adjusted to a smaller value for a lower relative loading on the macro eNodeB. In this way, the tendency of range extension to shift load from the macro eNodeB to the micro eNodeB will be enhanced when the relative loading on the macro eNodeB is higher, and will be dampened when the relative loading on the macro eNodeB is lower. Example embodiments for carrying out this advantageous dynamic adjustment are further described below.

b. Example Operation

Figure 4:
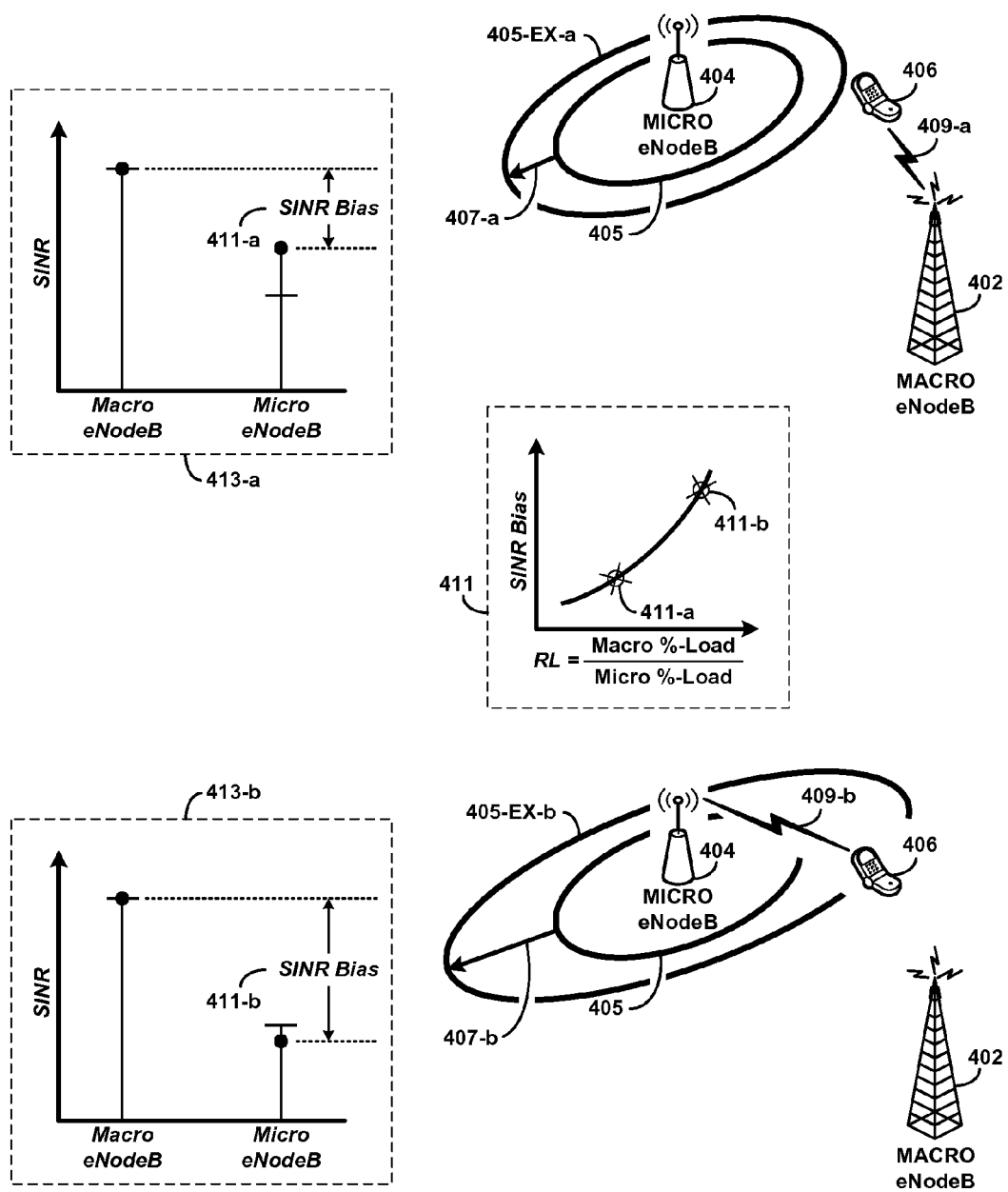
FIG. 4 illustrates example operation of an example embodiment of a method of adjusting SNR bias based on load for representative micro-type and macro-type base stations.

An embodiment of dynamic adjustment of SINR bias based on load can be illustrated in terms of example operation, with reference to FIG. 4. At the top right side of the figure, a macro eNodeB 402 is depicted as providing access to a UE 406 via an air interface 409-*a*. Also depicted at the top of FIG. 4 is a micro eNodeB 404 having both a micro coverage area 405 and an expanded micro coverage area 405-EX-a. For purposes of the present discussion, both the micro coverage area 405 and the expanded micro coverage area 405-EX-a are taken to be circular, with the expanded micro coverage area having a radius that is larger by a range expansion 407-*a*. Evidently (and by way of example), the UE 406 is located beyond the boundary of the expanded micro coverage area 405-EX-a, and therefore is receiving service from the macro eNodeB 402.

At the top left side of FIG. 4, a dashed-line box 413-*a* encloses a graphical representation of a SINR bias 411-*a*. In the graph, SINR is measured along the vertical axis, and the SINR of the macro and micro NodeBs are indicated as vertical "SINR lines" at respective locations along the horizontal axis. The SINR line of the macro eNode is located to the left of the SINR line of the micro eNodeB. The SINR bias 411-*a* is indicated as the difference in height between a black dot on the SINR line of the macro eNodeB and a black dot on the SINR line of the micro eNodeB. A short horizontal line on the SINR line of the macro eNodeB marks the currently-detected SINR of the macro eNodeB; a similar marking on the SINR line of the micro eNodeB indicates the currently detected SINR of the micro eNodeB.

In accordance with example operation of the example embodiment, if the UE 406 detects SINR from the micro eNodeB 404 that is within the region of the SINR bias 411-*a* (or at a level above the currently-detected SINR from the macro eNodeB 402), then it will seek or maintain service from the micro eNodeB 404. This is evidently (and by way of example) not the case in the illustration at the top of FIG. 4: as indicated by short horizontal line marking the currently-detected SINR of the micro eNodeB 404, the UE 406 detects SINR from the micro eNodeB 404 that more than the SINR bias 411-*a* below the SINR detected from the macro eNodeB 402. This corresponds to the UE 406 being located outside of the expanded micro coverage area 405-EX-a, as indicated in the illustration at the top right side of FIG. 4.

A dashed-line box 411 in the middle portion of FIG. 4 illustrates an example functional relation between the relative loading of the macro and micro eNodeBs and the SINR bias. This functional relation provides an example basis for dynamically adjusting the SINR bias based on the relative load. In accordance with the example embodiment, the relative loading, indicated along the horizontal axis of the functional relation, is measured as a ratio RL of (i) utilization of the macro eNodeB (e.g., as a fraction or percentage of a maximum capacity of the macro eNodeB) to (ii) utilization of the micro eNodeB (e.g., as a fraction or percentage of a maximum capacity of the micro eNodeB). The SINR bias, measured on the vertical axis, is determined as a function of RL. As the relative loading RL increases, the determined SINR bias also increases, and vice versa. As illustrated in the present example, the SINR bias 411-*a* corresponds to a low value of RL, and another, larger value of SINR bias 411-*b* corresponds to a higher value of RL.

The effect of the larger SINR bias 411-*b* is illustrated in the bottom portion of FIG. 4, where a graphical representation of a SINR bias 411-*b* is shown inside the dashed-line box 413-*b*. An explanation of the graph inside the dashed-line box 413-*b* is similar to that of the graph of SINR bias 411-*a* inside the dashed-line box 413-*a*, except the application of the larger SINR bias 411-*b* now places the currently-detected SINR of the micro eNodeB 404 above the black dot on the SINR line of the micro eNodeB 404, and therefore within the region of the SINR bias 411-*b*. In other words, the UE 406 now detects a SINR of the micro eNodeB 404 that is not more that the SINR bias 411-*b* below the SINR of the macro eNodeB 402.

Corresponding to the larger SINR bias 411-*b* represented graphically inside the dashed-line box 413-*b* is a larger micro coverage area 405-EX-b, illustrated at the bottom right side of FIG. 4. More particularly, the larger SINR bias 411-*b* results in a larger range expansion 407-*b*, thereby enlarging the coverage area within which a UE can favor the more weakly detected micro eNodeB 404. This is depicted by the UE 406 now being located just within the micro coverage area 504-EX-b; the UE 406 now has an air interface connection 409-*b* with the micro eNodeB 404.

In accordance with the example embodiment, application of the dynamically adjusted SINR bias to a comparison of the SINR levels respectively detected from the micro eNodeB 404 and the macro eNodeB 402 can be carried by the UE 406, by a controlling RAN element (e.g., the MME), or both. For example, a given UE could use the comparison to request a handoff from one eNodeB to another, or to determine to maintain service with a current eNodeB and not handoff to the other. Alternatively, the UE could report the detected SINR levels to the MME, and the MME could direct the UE to handoff. As still further alternative, a decision to handoff could be made by one or the other of two eNodeBs, again based on a report by the UE of the detected SINR levels of the two eNodeBs. In any of these operational scenarios, a comparison of the detected SINR levels will take account of the SINR bias, as described above. Accordingly, whichever entity or entities make the comparison will be supplied with the dynamically adjusted SINR bias.

More particularly, the dynamic adjustment of SINR bias based on relative load will be made by one or another RAN component that incorporates functionality to make a relative load determination, such as RL, for a micro and macro eNodeB, and to responsively adjust the SINR bias. After dynamically adjusting the SINR bias to an updated value, the RAN component will then supply the updated SINR bias to the entity or entities that apply the SINR bias to the SINR comparisons. By way of example, the RAN component may be taken to be an MME and the entities that apply the SINR bias may be taken to be UEs being served in the RAN.

Referring again to the heterogeneous RAN illustrated in FIG. 3, an MME (not shown) could monitor the loading of the macro eNodeB 302 and the micro eNodeBs 304-1, 304-2, 304-3, and 304-4, and periodically compute a respective RL for the macro eNodeB paired with each of the micro eNodeBs. The MME could then determine an updated SINR bias for each pair by consulting a look-up table or similar data structure that tabulates RL against SINR bias. Such a table or data structure could be stored in one or another form of memory (e.g., solid state, magnetic disk, etc.) that is part of, and accessible to, the MME. After determining the respective updated SINR bias for each macro eNodeB/micro eNodeB pair, the MME could communicate the respective updated SINR bias to the macro and micro eNodeBs, and each could then communicate its respective SINR bias to the UEs each is currently serving.

FIG. 5 illustrates an example SINR bias look-up table 500 that could be stored in the memory of an MME (or other RAN component) and applied to dynamic adjustment of SINR based on loading. The example table 500 includes a first column 502 that tabulates five ranges of macro base station loading, a second column 504 that tabulates three ranges of micro base station loading for each of the five ranges in the first column 502 (15 total ranges in the second column), and a third column 506 that tabulates a SINR bias for each of the tabulated ranges in the second column 504 (15 total SINR bias values in the third column). In the example embodiment, the micro and macro base stations could be micro and macro eNodeBs, respectively.

The macro base station loading in the first column 502 is listed as a percentage, x, where the value corresponds to a utilization or fraction (percentage) of a maximum capacity of the macro base station. As such, the loading could be measured as a ratio of a number UE currently being serviced by the macro base station to maximum number that the macro base station can service. Alternatively, the capacity could be measured in terms of a number of concurrent communication sessions, a supportable volume of data traffic (e.g., megabits per second, or the like), or some other form of data transport limit. A similar definition applies to the micro base station loading in the second column 504, which is listed as a percentage y of a maximum capacity. The SINR bias in the third column 506 is measured in dB.

In accordance with the example embodiment, the MME (or other RAN component) could use the table 500 to dynamically adjust the SINR bias by first determining the loading of the macro base station (e.g., macro eNodeB 302 in FIG. 3), for example by receiving a periodic message from the macro base station, or by coordinating communication sessions with UEs in the heterogeneous RAN. The MME could make a similar determination of the loading of the micro base station (e.g., micro eNodeB 304-3 in FIG. 3). The MME could then determine in which of the five ranges of x (the first column 502) the determined macro base station loading falls. For a given determined range of x, the MME next determine in which of the three ranges of y (the second column 504) the determined micro base station loading falls. Finally, the MME would select the SINR bias (the third column 506) corresponding to the determined range of y.

As an example, for a determined macro base station loading of 91% and a determined micro base station loading of 83%, the determined SINR bias would be 4 dB. For the same macro base station loading and a micro base station loading of 69%, the determined SINR bias would be 5 dB; and for the same macro base station loading and a micro base station loading of 55%, the determined SINR bias would be 6 dB. This example illustrates that when the relative loading of the macro base station is high (e.g., greater than 90% in this example), the trend is make the SINR bias large, so as use enhanced range extension to help shift load from the macro base station to the micro base station. At the same time, the second column takes into account the load on the micro base station. Specifically, the degree to which range extension is enhanced increases as the relative load of the micro base station decreases. Thus, the largest SINR bias is associated with the smallest micro base station load, and vice versa.

The above reasoning is easily applied to the other entries in the look-up table 500. As one more particular example, a determined macro base station loading of 40% or less corresponds to the smallest range of x in the table. For x in this range and a determined micro base station loading y greater than 80%, the adjusted SINR bias is zero dB, corresponding to no range extension. In this case, the relatively low load on the macro base station and relatively high load on the micro base station warrants the restriction of range extension.

It will be appreciated that other approaches could be used to compare the relative loading of a macro and micro base station in order to determine and adjusted value of SINR bias (or more generally, SNR bias). For instance, one or more thresholds could be applied to the ratio of relative loading to determine which of one or more corresponding values SINR bias should be selected. Alternatively, the one or more thresholds could be applied to a difference between the relative loading of the macro and micro base stations. Either of these approaches could be implemented in a look-up table or similar data structure, or by encoding a computational algorithm in machine logic instructions executable by one or more processors of the MME (or other RAN component), or some combination thereof. For instance, the computational algorithm could represent a function relation between RL and SINR bias, such as the one illustrated in the dashed-line box 411 in FIG. 4.

3. Implementation of Example Embodiment

As described above, the example embodiment involves actions and operations carried out by a RAN component, such as an MME, an RNC, or a BSC. Accordingly, the example embodiment can be implemented as executable steps and operations of a method carried out by such a device. Implementation of the example embodiment can further be considered as including means for carrying the method. An example implementation of the method and means is described below. By way of example, the device is taken to be configured to operate according to LTE Advanced.

a. Example Method Implementation

Figure 6:
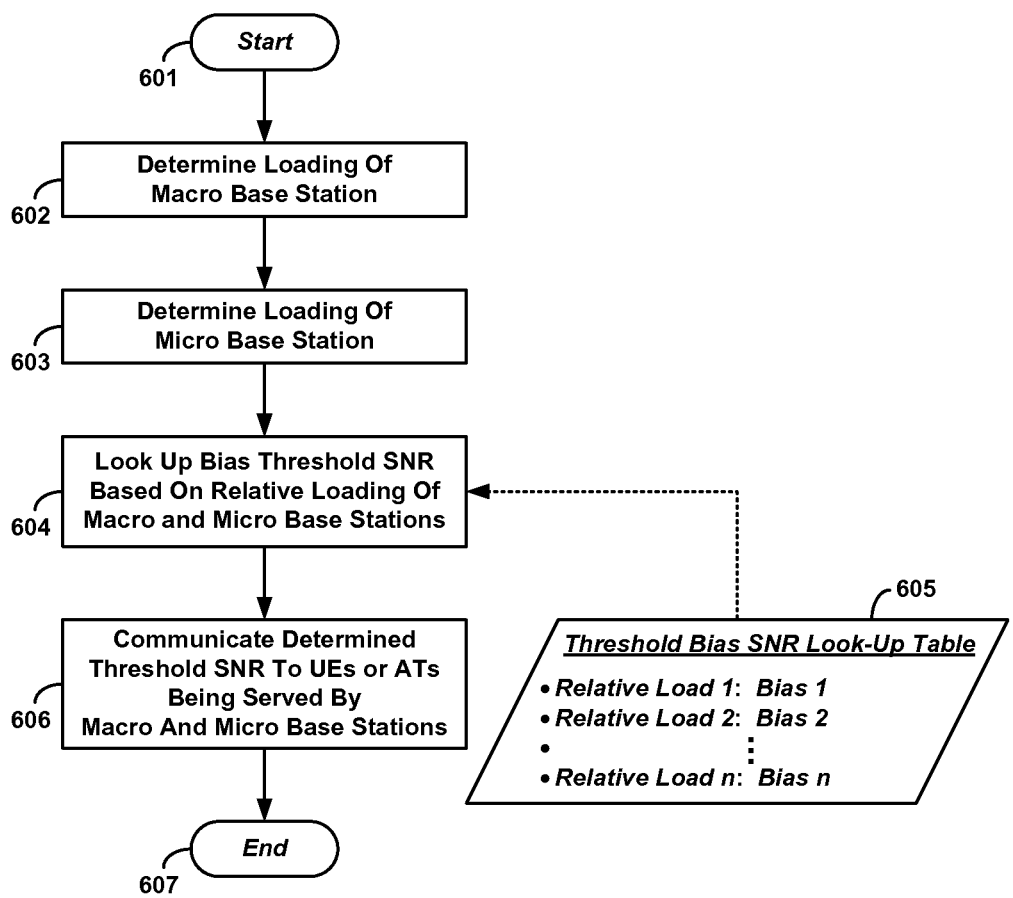
FIG. 6 illustrates an example embodiment of logical steps for implementing in an access network an embodiment of a method of adjusting SNR bias based on load.

FIG. 6 is a logical flowchart representing executable steps and operations that could be carried out by RAN device to implement a method of adjusting SNR bias based on load. The steps could be implemented as software, firmware, and/or hardware instructions stored in physical memory of an RNC, MME, or eNodeb, or the like, and executed by one or more general purpose and/or special purpose processors. The executable instructions could also be stored on some form of non-transitory tangible computer readable storage medium, such as magnetic or optical disk, or the like, and provided for transfer to the memory of the RNC, MME, or eNodeb during configuration or other step(s) for preparing the base station for operation.

The process as illustrated begins at start 601, wherein it may be assumed that the device is communication with a macro base station and a micro base station of a heterogeneous RAN. At step 602, the device determines the relative loading of the macro base station. This could be accomplished according to the description of example operation above. At step 603, the device determines the relative loading of the micro base station. This could also be accomplished according to the description of example operation above.

At step 604, the device consults a threshold bias SNR look-up table 605 in order to determine an updated value of threshold SNR bias based on the relative loads determined at steps 602 and 603. The dashed arrow pointing from the threshold bias SNR look-up table to step 604 represents access to the look-up table in carrying out step 604.

The look-up table 605 could correspond to the look-up table 500 illustrated in FIG. 5, for instance, and could be stored in memory associated with, and accessible to, the RAN device. The labeling of entries in the look-up table 605 may be considered abbreviations of how actual entries might be configured. For example, "Relative Load 1" could correspond to a particular range of x and a particular range of y in the look-up table 500. Similarly, "Bias 1" could correspond to the particular SINR bias associated with the particular x and y values.

Once the SNR bias is determined at step 604, the device then communicates the determined SNR bias to UEs or ATs being served by the macro and micro base stations at step 606. This could be accomplished by providing the macro and micro base stations with the updated SNR bias; the base stations could then transmit the updated SNR bias to UEs or ATs being served in one or another message. The process completes at step 607, but could repeat periodically or from time to time.

It will be appreciated that the steps shown in FIG. 6 are meant to illustrate operation of the example embodiment. As such, various steps could be altered or modified, the ordering of certain steps could be changed, and additional steps could be added, while still achieving the overall desired operation.

b. Example Device

Figure 7:
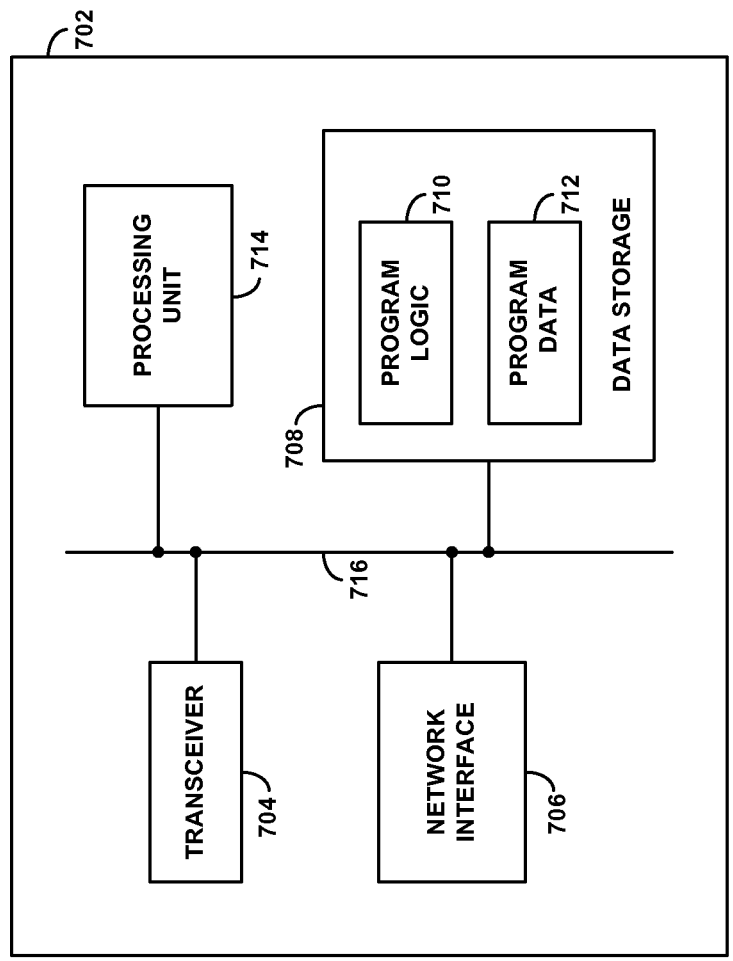
FIG. 7 is a block diagram of an example access network element in which an example embodiment of a method of adjusting SNR bias based on load may be implemented.

FIG. 7 is a simplified block diagram depicting functional components of an example device 702 in which operation of adjusting SNR bias based on load may be implemented. As shown in FIG. 7, the example device 702, representative of MME 246 in FIG. 2, for instance, includes a transceiver 704, network interface 706, a processing unit 714, and data storage 708, all of which may be coupled together by a system bus 716 or other mechanism. In addition, the base station may also include external storage, such as magnetic or optical disk storage, although this is not shown in FIG. 7.

These components may be arranged to support conventional operation in a wireless communication network that is compliant with LTE Advanced, such as network 200-b illustrated in FIG. 2b. The details of such an arrangement and how these components function to provide conventional operation are known, and are not described further herein. Certain aspects of device 702 relevant to adjusting SNR bias based on load are discussed briefly below.

Network interface 706 enables communication on a network, such network 200-b. As such, network interface 706 may take the form of an Ethernet network interface card or other physical interface to a broadband connection to the internet or some other data network, and further may be able support a VPN connection terminated in a communication network such as network 200-b, for instance. Further, network interface 706 in combination with transceiver 704, which may include one or more macro base station or micro base station eNodeB antennas, enables air interface communication with one or more access terminals, supporting both downlink and uplink transmissions.

Processing unit 714 comprises one or more general-purpose processors (e.g., INTEL microprocessors) and/or one or more special-purpose processors (e.g., dedicated digital signal processor, application specific integrated circuit, etc.). In turn, the data storage 708 comprises one or more volatile and/or non-volatile storage components, such as magnetic or optical memory or disk storage. Data storage 708 can be integrated in whole or in part with processing unit 714, as cache memory or registers for instance. As further shown, data storage 708 is equipped to hold program logic 710 and program data 712.

Program data 712 may comprise data such as example threshold bias SNR look-up table 500, look-up table 605, or the like. Program logic 710 may comprise machine language instructions that define routines executable by processing unit 714 to carry out various functions described herein. In particular the program logic, communication interface, and transceiver may operate cooperatively to carry out logical operation such as that discussed above and illustrated in FIG. 6.

It will be appreciated that there can be numerous specific implementations of a RAN device, such as device 702, in which a method of adjusting SNR bias based on load could be implemented. Further, one of skill in the art would understand how to devise and build such an implementation. As such, device 702 is representative of means for carrying out a method of adjusting SNR bias based on load, in accordance with the methods and steps described herein by way of example.

4. Conclusion

An example embodiment has been described above. Those skilled in the art will understand, however, that changes and modifications may be made to this embodiment without departing from the true scope and spirit, which is defined by the claims.

We claim:

1. In a device configured to communicate with a plurality of heterogeneous types of base stations of a wireless communication system, the plurality including at least a macro base station and a micro base station, a method comprising:
   at the device, determining a relative load of access terminals being served by the macro base station and by the micro base station;
   at the device, based on the determined relative load, adjusting a signal-to-noise ratio (SNR) bias corresponding to a threshold differential SNR between SNRs of the macro base station and of the micro base station, wherein the SNR bias is configured to be provided to an access terminal to cause the access terminal (i) to be biased to seek service from the micro base station if the access terminal detects an SNR from the micro base station that is less than the threshold differential SNR below an SNR that the access terminal detects from the macro base station, and (ii) to be biased to seek service from the macro base station otherwise; and
   at the device, communicating the adjusted SNR bias to one or more access terminals,
   wherein determining the relative load of access terminals being served by the macro base station and by the micro base station comprises:
   determining a first fraction of a maximum service capacity of the macro base station being used by the macro base station to serve a first group of access terminals;
   determining a second fraction of a maximum service capacity of the micro base station being used by the micro base station to serve a second group of access terminals; and
   comparing the first and second fractions.

2. The method of claim 1, wherein the macro base station is at least one of a cell and a sector, and the SNR of the macro base station comprises SNR of the at least one cell or sector, and wherein the micro base station is one of a microcell, a picocell, and a femtocell, and the SNR of the micro base station comprises SNR of the one microcell, picocell, or femtocell.

3. The method of claim 2, wherein the device comprises a Mobility Management Entity (MME) configured to operate according to Long Term Evolution (LTE) Advanced protocols, and wherein the macro base station and the micro base station each comprise an evolved NodeB (eNB) element configured to operate according to LTE Advanced protocols.

4. The method of claim 2, wherein the device comprises a Radio Network Controller (RNC) configured to operate according to Universal Mobile Telecommunication System (UMTS) protocols, and wherein the macro base station and the micro base station each comprise a NodeB element configured to operate according to UMTS protocols.

5. The method of claim 1, wherein determining the relative load of access terminals being served by the macro base station and by the micro base station further comprises determining a ratio of a first number of access terminals being served by the macro base station to a second number of access terminals being served by the micro base station.

6. The method of claim 1, wherein adjusting the SNR bias based on the determined relative load comprises:
increasing the threshold differential SNR if the determined relative load corresponds to a load on the macro base station being greater than a threshold differential load above a load on the micro base station; and
decreasing the threshold differential SNR if the determined relative load corresponds to the load on the macro base station being less than the threshold differential load above the load on the micro base station.

7. The method of claim 6, wherein the wireless communication system is configured to operate according to Long Term Evolution (LTE) Advanced protocols,
wherein the device comprises a Mobility Management Entity (MME) configured to operate according to LTE Advanced protocols,
wherein the macro base station and the micro base station each comprise an evolved NodeB (eNB) element configured to operate according to LTE Advanced protocols,
wherein the access terminal comprises a User Equipment (UE) element configured to operate according to LTE Advanced protocols,
wherein an SNR detected from the macro base station corresponds to a signal to interference plus noise ratio (SINR) on a downlink from the macro base station,
and wherein an SNR detected from the micro base station corresponds to a SINR on a downlink from the micro base station.

8. The method of claim 1, wherein communicating the adjusted SNR bias to the one or more access terminals comprises communication the SNR bias to a first group of access terminals being served by the macro base station and to a second group of access terminals being served by the micro base station.

9. The method of claim 1, wherein causing the access terminal to be biased to seek service from the micro base station comprises causing the access terminal to be biased to hand off to the micro base station,
and wherein causing the access terminal to be biased to seek service from the macro base station comprises causing the access terminal to be biased to hand off to the macro base station.

10. The method of claim 1, wherein the device is selected from the group consisting of the macro base station and the micro base station.

11. A device configured to communicate with a plurality of heterogeneous types of base stations of a wireless communication system, the plurality including at least a macro base station and a micro base station, the device comprising:

means for determining a relative load of access terminals being served by the macro base station and by the micro base station;
means for adjusting a signal-to-noise ratio (SNR) bias based on the determined relative load, wherein the SNR bias corresponds to a threshold differential SNR between SNRs of the macro base station and of the micro base station, and wherein the SNR bias is configured to be provided to an access terminal to cause the access terminal (i) to be biased to seek service from the micro base station if the access terminal detects an SNR from the micro base station that is less than the threshold differential SNR below an SNR that the access terminal detects from the macro base station, and (ii) to be biased to seek service from the macro base station otherwise; and
means for communicating the adjusted SNR bias to one or more access terminals,
wherein determining the relative load of access terminals being served by the macro base station and by the micro base station comprises:
determining a first fraction of a maximum service capacity of the macro base station being used by the macro base station to serve a first group of access terminals;
determining a second fraction of a maximum service capacity of the micro base station being used by the micro base station to serve a second group of access terminals; and
comparing the first and second fractions.

12. The device of claim 11, wherein the macro base station is at least one of a cell and a sector, and the SNR of the macro base station comprises SNR of the at least one cell or sector,
and wherein the micro base station is one of a microcell, a picocell, and a femtocell, and the SNR of the micro base station comprises SNR of the one microcell, picocell, or femtocell.

13. The device of claim 12, wherein the device comprises a Mobility Management Entity (MME) configured to operate according to Long Term Evolution (LTE) Advanced protocols,
and wherein the macro base station and the micro base station each comprise an evolved NodeB (eNB) element configured to operate according to LTE Advanced protocols.

14. The device of claim 12, wherein the device comprises a Radio Network Controller (RNC) configured to operate according to Universal Mobile Telecommunication System (UMTS) protocols,
and wherein the macro base station and the micro base station each comprise a NodeB element configured to operate according to UMTS protocols.

15. The device of claim 11, wherein determining the relative load of access terminals being served by the macro base station and by the micro base station further comprises determining a ratio of a first number of access terminals being served by the macro base station to a second number of access terminals being served by the micro base station.

16. The device of claim 11, wherein adjusting the SNR bias based on the determined relative load comprises:
increasing the threshold differential SNR if the determined relative load corresponds to a load on the macro base station being greater than a threshold differential load above a load on the micro base station; and
decreasing the threshold differential SNR if the determined relative load corresponds to the load on the macro base station being less than the threshold differential load above the load on the micro base station.

17. The device of claim 16, wherein the wireless communication system is configured to operate according to Long Term Evolution (LTE) Advanced protocols,
- wherein the device comprises a Mobility Management Entity (MME) configured to operate according to LTE Advanced protocols,
- wherein the macro base station and the micro base station each comprise an evolved NodeB (eNB) element configured to operate according to LTE Advanced protocols,
- wherein the access terminal comprises a User Equipment (UE) element configured to operate according to LTE Advanced protocols,
- wherein an SNR detected from the macro base station corresponds to a signal to interference plus noise ratio (SINR) on a downlink from the macro base station,
- and wherein an SNR detected from the micro base station corresponds to a SINR on a downlink from the micro base station.

18. The device of claim 11, wherein communicating the adjusted SNR bias to the one or more access terminals comprises communication the SNR bias to a first group of access terminals being served by the macro base station and to a second group of access terminals being served by the micro base station.

19. The device of claim 11, wherein causing the access terminal to be biased to seek service from the micro base station comprises causing the access terminal to be biased to hand off to the micro base station,
- and wherein causing the access terminal to be biased to seek service from the macro base station comprises causing the access terminal to be biased to hand off to the macro base station.

20. The device of claim 11, wherein the device is selected from the group consisting of the macro base station and the micro base station.

21. A nontransitory computer-readable medium having instructions stored thereon that, upon execution by a device configured to communicate with a macro base station and a micro base station of a wireless communication system, cause the device to carry out functions comprising:
- determining a relative load of access terminals being served by the macro base station and by the micro base station;
- based on the determined relative load, adjusting a signal-to-noise ratio (SNR) bias corresponding to a threshold differential SNR between SNRs of the macro base station and of the micro base station, wherein the SNR bias is configured to be provided to an access terminal to cause the access terminal (i) to be biased to seek service from the micro base station if the access terminal detects an SNR from the micro base station that is less than the threshold differential SNR below an SNR that the access terminal detects from the macro base station, and (ii) to be biased to seek service from the macro base station otherwise; and
- communicating the adjusted SNR bias to one or more access terminals,
- wherein adjusting the SNR bias based on the determined relative load comprises:
- increasing the threshold differential SNR if the determined relative load corresponds to a load on the macro base station being greater than a threshold differential load above a load on the micro base station; and
- decreasing the threshold differential SNR if the determined relative load corresponds to the load on the macro base station being less than the threshold differential load above the load on the micro base station.

22. The nontransitory computer-readable medium of claim 21, wherein determining the relative load of access terminals being served by the macro base station and by the micro base station comprises:
- determining a first fraction of a maximum service capacity of the macro base station being used by the macro base station to serve a first group of access terminals;
- determining a second fraction of a maximum service capacity of the micro base station being used by the micro base station to serve a second group of access terminals; and
- comparing the first and second fractions.

23. The nontransitory computer-readable medium of claim 21, wherein the wireless communication system is configured to operate according to Long Term Evolution (LTE) Advanced protocols,
- wherein the device comprises a Mobility Management Entity (MME) configured to operate according to LTE Advanced protocols,
- wherein the macro base station and the micro base station each comprise an evolved NodeB (eNB) element configured to operate according to LTE Advanced protocols,
- wherein the access terminal comprises a User Equipment (UE) element configured to operate according to LTE Advanced protocols,
- wherein an SNR detected from the macro base station corresponds to a signal to interference plus noise ratio (SINR) on a downlink from the macro base station,
- and wherein an SNR detected from the micro base station corresponds to a SINR on a downlink from the micro base station.

24. The nontransitory computer-readable medium of claim 21, wherein causing the access terminal to be biased to seek service from the micro base station comprises causing the access terminal to be biased to hand off to the micro base station,
- and wherein causing the access terminal to be biased to seek service from the macro base station comprises causing the access terminal to be biased to hand off to the macro base station.

25. The nontransitory computer-readable medium of claim 21, wherein the device is selected from the group consisting of the macro base station and the micro base station.

* * * * *